United States Patent
Cudennec et al.

(10) Patent No.: US 9,063,858 B2
(45) Date of Patent: Jun. 23, 2015

(54) MULTI-CORE SYSTEM AND METHOD FOR DATA CONSISTENCY BY MEMORY MAPPING ADDRESS (ADB) TO HASH TABLE PATTERN ASSOCIATED WITH AT LEAST ONE CORE

(75) Inventors: Loïc Cudennec, Châtillon (FR); Jussara Marandola, Massy-Palaiseau (FR); Jean-Thomas Acquaviva, Paris (FR); Jean-Sylvain Camier, Rambouillet (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 191 days.

(21) Appl. No.: 13/980,886

(22) PCT Filed: Dec. 23, 2011

(86) PCT No.: PCT/EP2011/074038
§ 371 (c)(1),
(2), (4) Date: Nov. 27, 2013

(87) PCT Pub. No.: WO2012/097944
PCT Pub. Date: Jul. 26, 2012

(65) Prior Publication Data
US 2014/0297960 A1    Oct. 2, 2014

(30) Foreign Application Priority Data

Jan. 21, 2011  (FR) .................................... 11 50500

(51) Int. Cl.
G06F 12/08  (2006.01)
G06F 12/02  (2006.01)

(52) U.S. Cl.
CPC .......... *G06F 12/084* (2013.01); *G06F 12/0292* (2013.01); *G06F 12/0815* (2013.01); *G06F 12/0831* (2013.01)

(58) Field of Classification Search
None
See application file for complete search history.

(56) References Cited

U.S. PATENT DOCUMENTS

| 5,829,017 | A  |  10/1998 | Ohtsuka |
| 7,325,102 | B1 |   1/2008 | Cypher |
| 7,363,435 | B1 |   4/2008 | Stenstrom |
| 8,099,556 | B2* |  1/2012 | Ghosh et al. ................. 711/122 |
| 8,161,263 | B2* |  4/2012 | Arimilli et al. .............. 711/204 |

(Continued)

OTHER PUBLICATIONS

Memik, G. et al., "Just Say No: Benefits of Early Cache Miss Determination", High-Performance mputer Architecture, 2003, pp. 307-316, (Feb. 8, 2003).*

(Continued)

*Primary Examiner* — Tammara Peyton
(74) *Attorney, Agent, or Firm* — Baker & Hostetler LLP (57) ABSTRACT

A system comprises a plurality of cores and a communication bus enabling the cores to communicate with one another, a core having a processor and of at least one cache memory area. At least one core comprises a table of patterns storing a set of patterns, a pattern corresponding to a series of memory addresses associated with a digital data item made up of binary words stored at these addresses. This core also comprises means for mapping one of the memory addresses AdB of a digital data item to a pattern that is associated with it when said core needs to access this data item and means for transmitting a unique message for access to a digital data item located in the cache memory of at least one other core of the system, said message including the memory addresses that make up the pattern of the data item sought.

14 Claims, 4 Drawing Sheets

(56) References Cited

U.S. PATENT DOCUMENTS

| | | | |
|---|---|---|---|
| 8,392,881 B1 * | 3/2013 | Lund et al. | 717/116 |
| 8,627,009 B2 * | 1/2014 | Mekhiel | 711/122 |
| 8,914,601 B1 * | 12/2014 | Lethin et al. | 711/168 |
| 2009/0113138 A1 * | 4/2009 | Bass et al. | 711/144 |

OTHER PUBLICATIONS

B. Kisacanin, "Integral Image Optimizations for Embedded Vision Applications", IEEE Southwest Symposium on Image Analyis and Interpretation, Mar. 24-26, 2008, pp. 181-184.

* cited by examiner

MULTI-CORE SYSTEM AND METHOD FOR DATA CONSISTENCY BY MEMORY MAPPING ADDRESS (ADB) TO HASH TABLE PATTERN ASSOCIATED WITH AT LEAST ONE CORE

CROSS-REFERENCE TO RELATED APPLICATIONS

This application is a National Stage of International patent application PCT/EP2011/074038, filed on Dec. 23, 2011, which claims priority to foreign French patent application No. FR 1150500, filed on Jan. 21, 2011, the disclosures of which are incorporated by reference in their entirety.

FIELD OF THE INVENTION

The invention relates to a multi-core system and a consistency method for data stored in such a system.

It applies notably to the field of multi-core systems and more particularly to maintaining the cache memory consistency in these architectures.

BACKGROUND

A multi-core system is an electronic system comprising a plurality of computation units called cores. The multi-core processors are an example thereof. Such a processor thus includes a plurality of cores in one and the same electronic chip and can comprise some tens to some hundreds of cores.

A multi-core system makes it possible to perform a number of processing operations in parallel. It is then possible to achieve computation powers greater than that of a single-core system while limiting the heat dissipation phenomenon. However, such systems have to include means for intelligently managing the resources shared by these cores, such as, for example, means for managing access to the cache memory of each core and to the memory external to the cores, the external memory also being called central memory or main memory. As a reminder, the cache memory is a type of memory usually placed in proximity to the hardware resource that uses it and whose objective is to store data copies so as to allow rapid access to this data item by said resource. To manage the cache memory, methods for maintaining the consistency of the data stored in this memory are usually used.

One method for maintaining cache memory consistency notably allows for the management of multiple copies of one and the same digital data item, said copies being situated in the cache memories associated with different cores. Maintaining the consistency of the data copies notably makes it possible to simplify the programming of the multi-core systems.

When a cache fault is detected, that is to say a data item sought by a core is not available in cache memory, said computation core has to search for the data item externally, that is to say either in the cache memory of another core, or in the main memory. For this, a core usually uses a memory interface implementing a memory interface protocol in order to access the data stored outside said core. The result of the execution of the memory interface protocol is the sending of messages via, for example, a communication bus that enable the cores to communicate with one another and with the main memory. These different operations induce, for a core, the consumption of computation resources to execute operations associated with the memory interface protocol. Furthermore, the set of messages sent can occupy a significant portion of the bandwidth of the communication bus and this can be prejudicial to an efficient operation of the multi-core system. In practice, if the communication bus is congested, the application running on the multi-core system is slowed down. A purpose of the method for maintaining memory consistency is notably to reduce the execution time associated with the memory interface protocol and to limit as far as possible the number of messages sent.

SUMMARY OF THE INVENTION

One aim of the invention is notably to mitigate the above-mentioned drawbacks.

To this end, the subject of the invention is a multi-core system comprising a plurality of cores and a communication bus enabling the cores to communicate with one another, a core being made up of a processor and of at least one cache memory area. A core comprises a table of patterns in which are stored a set of patterns, a pattern corresponding to a series of memory addresses associated with a digital data item made up of binary words stored at these addresses. This core also comprises means for mapping one of the memory addresses AdB of a digital data item to a pattern that is associated with it when said core needs to access this data item as well as means for transmitting a unique message for access to a digital data item located in the cache memory of at least one other core of the system, said message including the memory addresses that make up the pattern of the data item sought.

According to one aspect of the invention, all of the cores of the system include a table of patterns. The table of patterns of a core is controlled by the processor of said core in collaboration with a hardware accelerator, the functions of said accelerator being to store the table of patterns and to establish the mapping between an input memory address AdB and one of the stored patterns.

According to another aspect of the invention, the series of addresses that make up a pattern is obtained by a pattern function applied to the input memory address AdB.

The patterns used are defined, for example, as follows:

$$Desc = f(AdB, L, D)$$

in which:

$f(\,)$ represents the function of the pattern, said function returning the L addresses starting from the address AdB, said L addresses being spaced apart by D addresses;

Desc represents the pattern descriptor, that is to say the series of addresses resulting from the application of the function $f(\,)$ with the set of parameters AdB, L and D;

AdB represents the base address, said address corresponding to the first address of the series of addresses that make up the pattern of the data item sought;

L is an integer number corresponding to the number of binary words included in the data item sought;

D corresponds to the offset making it possible to go from the address of a binary word to the address of the next binary word included in the pattern.

The table of patterns is, for example, loaded when the system is started up. This table of patterns can be a hash table.

In one embodiment, when a core comprising a table of patterns requires memory access to a data item associated with a memory address AdB and a pattern is found, this core sends a message to another core, called pattern manager core CGM in charge of managing this pattern, the function of said CGM core being to find the data item associated with the pattern in its cache memory and to send it to the requesting core.

Each core of the system is, for example, identified by an index, the index of a CGM core being determined by using the expression:

$$CGM_i = (AdB/TP)\%N$$

in which:
CGMi represents the index of the pattern manager core;
TP represents the size of the memory pages of the system;
AdB represents the base address of the data item sought;
N represents the total number of cores of the system.

A consistency table can be stored in at least one of the cores of the system, said table comprising an indication of the presence or of the absence of digital data items in the cache memory of other cores of the system.

According to one aspect of the invention, a core is called conventional management core CGC when it comprises a data item sought by another core, called requesting core, and comprising a consistency table, said data item having been located in the CGC core by virtue of said table, a CGC core being identified by the requesting core by using the following expression:

$$CGC_i = (AdB/TL)\%N$$

in which:
CGCi represents the index of the conventional manager core;
TL represents the size of a cache memory line.

The cores are, for example, interconnected by a network with "mesh" type topology.

Another subject of the invention is a data search method for memory access via a core included in a multi-core system as described previously, the following steps being applied when access to a data item stored in the system is requested by said core:
- a step of searching for the data item sought in the cache memory of said core;
- if the search is unsuccessful, a step of checking for the presence of the data item sought in the cache memory of another core by using a table of patterns;
- if a pattern associated with the data item sought is found, a step of sending a unique access message comprising the addresses of the pattern to the core responsible for said pattern.

The method comprises, for example, a step of checking for the presence of the data item sought in the cache memory of another core by using a consistency table.

Advantageously, the implementation of the invention makes it possible to improve the execution time of the applications implemented by multi-core systems, and allows for a limited silicon footprint for the hardware support implementing the method for maintaining cache consistency.

BRIEF DESCRIPTION OF THE DRAWINGS

Other features and advantages of the invention will become apparent from the following description, given as a nonlimiting illustration, and in light of the appended drawings in which.

DETAILED DESCRIPTION

Figure 1:
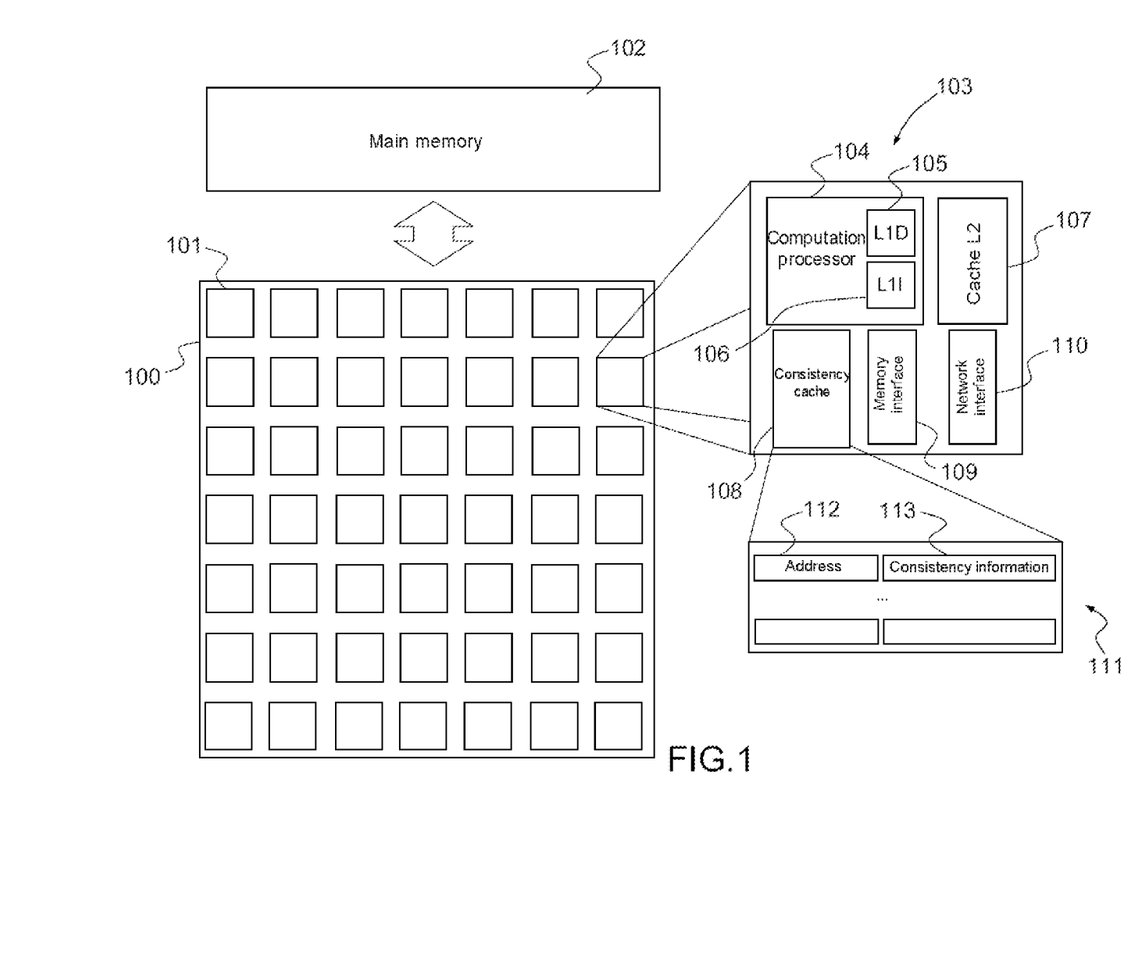
FIG. 1 gives an example of a multi-core chip.

FIG. 1 gives an example of a multi-core chip 100 consisting of 49 computation cores 101. Such an architecture may in practice comprise any number of cores, for example 64. It is usually associated with a main memory 102, said main memory making it possible to store large quantities of data. This type of memory, however, involves a much greater access time than for cache memories.

The cores included in this multi-core system are interconnected by a network with "mesh" type topology, that is to say that the communications are set up step by step, with no centralized organization.

In this type of architecture, a method for maintaining the consistency of the stored data is applied notably when a data item stored in the main memory of the system is replicated in the cache memories of the different cores in the course of read and write operations.

A core 103 usually consists of a computation processor 104, a level 1 cache memory, called L1, for storing instructions 105 and data 106, a level 2 cache memory, called L2 107, a directory for the consistency of the level 2 cache memory 108, and interface modules with the main memory 109 and the other cores of the system 110. The physical memory of the multi-core system is shared and distributed over the cores with a single addressing space.

Hereinafter in the description, the term "granularity" is used to designate the size of the smallest set of bits controlled by the cache consistency protocol, such a set being called consistency unit.

The use of a fine granularity makes it possible to lock a memory space of small size without affecting the access to the other data. This strategy involves managing a large volume of metadata with potential consequential storage and computation time problems.

Conversely, an excessively large granularity induces a false sharing problem, at the point where the locking of a consistency unit prevents access to data unaffected by the update. The choice of the granularity of a consistency protocol is therefore primarily dictated by the underlying hardware infrastructure. The granularity depends on the architecture of the multi-core system.

The granularity can be chosen, for example, to be equal to the length of a cache memory line. Typical granularity values are 64 or 128 bytes depending on the hardware architecture.

Hereinafter in the description, the term "data item" refers to a set of binary words, said binary words comprising a number of bits less than or equal to the consistency unit. A binary word is associated with a memory which means that, if a data item comprises more than one binary word, the latter is associated with a plurality of addresses.

In order to manage the consistency of the copies of a data item in cache memory, the methods for maintaining cache consistency usually rely on a representation of the state of the system. This representation is implemented, for example, using a table called consistency table or cache 108 and is stored in each of the cores of the system. For a given core, this table contains, for each data item, the information on its presence in the cache memory of other cores of the system as well as the current mode of access to the data item. This table is made up, for example, of rows containing an address 112 and a set of bits containing information on the consistency 113 of said data item stored at this address 112.

An example of a method for maintaining cache consistency is implemented in the context of the MESI (modified exclusive, shared, invalid) protocol. When this protocol is used, the current mode of access to a data item can be represented by one of the four possible states. These four states are defined below:

- the "modified" state, also called state M, indicates that the data item present in the cache memory is not consistent with the data item stored in the main memory, which means that the main memory potentially has to be updated. The copies of this data item located on the other cores or in the main memory are potentially different and cannot be used;
- the "exclusive" state, also called state E, indicates that the data item is consistent, that is to say that it is identical to that present in the main memory. Furthermore, it is present only in the cache memory of the core with which this consistency cache is associated. In this case, the data item is in exclusive access mode on this core;
- the "shared" state, also called state S, indicates that the data item is consistent, in read-only mode on this core and that copies in the same state may be present on other cores;
- the "invalid" state, also called state I, indicates that the data item present on this core is not up to date.

The consistency information binary words 113 present in the consistency table 111 comprise a field indicating the state of the data item as well as a vector of B bits indicating the cores in which a copy of said data item is stored. As an example, the following convention can be chosen: the ith bit of said vector indicates the presence or the absence of a copy of this data item on the ith core.

The representation of the state of the system is usually managed on the principle of a catalog centralized by a particular core, usually referred to as "home-node" and hereinafter in the description called conventional manager core CPC. When the multi-core system reaches a large scale, for example when this comprises a number of tens of cores, this manager core is then invoked a lot and performance problems occur. The catalog may then be distributed in different local views present on several or even all of the cores of the system, each of the cores being responsible for a subset of data. In this case, each core of the system can be seen as a CGC core, for example for a read or write mode access request to a particular data item by a requesting core.

FIGS. 2A, 2B, 2C and 2D give an example of the different phases executed in a write request by a core for maintaining the consistency of the cache memory.

These phases correspond to the transmission of messages between the different cores and to the execution by the cores of the associated processes. In this example, a core called requesting core CD 200 needs to write data. To this end, it contacts a conventional manager core CGC 201. The manager core CGC contains information on which cores include a copy of the data item sought, that is to say the data item to be updated.

Figure 2A:
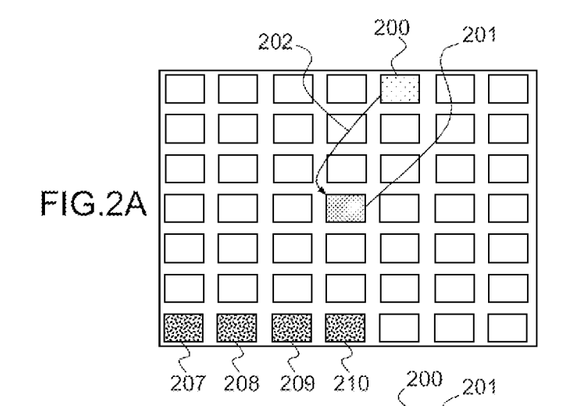
FIGS. 2A, 2B, 2C and 2D give an example of the different phases of execution of a write request by a core for maintaining consistency of the cache memory.

In a first stage, as illustrated in FIG. 2A, the requesting core 200 sends a message 202 to the CGC core 201. Said message comprises the address of the data item sought.

Figure 2B:
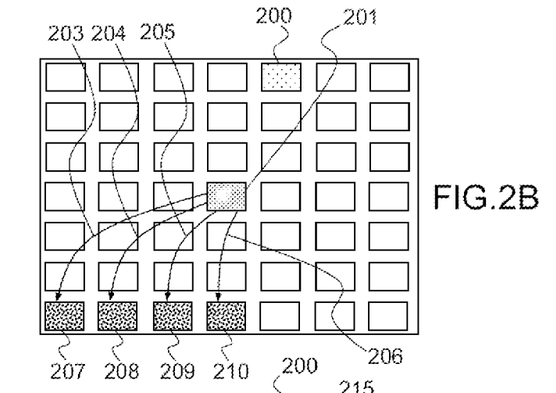

In a second stage, and as illustrated in FIG. 2B, exclusive mode access messages 203, 204, 205, 206 are sent to the cores 207, 208, 209, 210 that have in their possession a copy of the data item to be updated and specify to them the memory address of said data item.

Figure 2C:
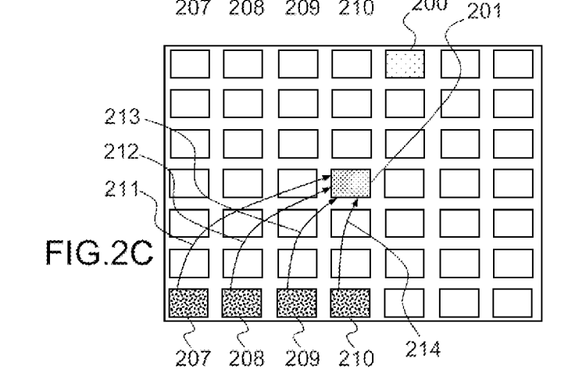

In a third stage, and as illustrated in FIG. 2C, the cores 207, 208, 209, 210 invalidate their copy and send notice of it 211, 212, 213, 214 to the CGC core 201 in return.

Figure 2D:
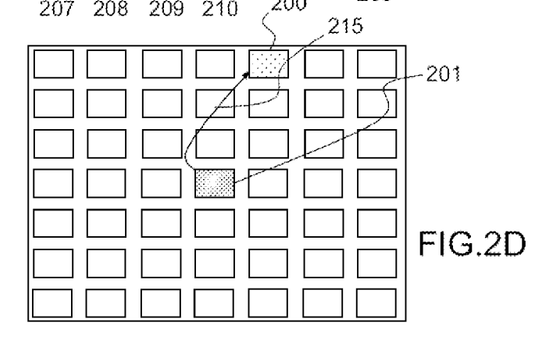

In a fourth stage, and as illustrated in FIG. 2D, a write mode access authorization 215 is transmitted to the requester, potentially with an update of the data item.

It can be seen in this example that a significant number M of messages is required to perform a write mode access request. Some applications require data to be read and/or written that is made up of binary words stored at memory locations which are not contiguous, that is to say that the addresses associated with these words are not consecutive. Such is the case, for example, with numerous image processing applications. In the context of some applications, the addresses associated with the binary words that make up a data item are predictable and regular. One example of such an application is the integral image computation application, as described in the article by B. Kisacanin entitled Integral Image Optimizations for Embedded Vision Applications, SSIAI 2008, IEEE Southwest Symposium on Image Analysis and Interpretation, pp. 181-184, 24-26 Mar. 2008. The processing consists of the aggregate sum of a matrix on its two dimensions. For this, the algorithm has to access rectangular blocks of the image to be processed.

The conventional methods for maintaining cache consistency work individually on each of the binary words that make up a data item.

In the context of image processing applications, the image is stored by placing the lines L one after the other in the memory space of the system used. In a multi-core system, a given number M of messages is required for a memory access. Reading a column of images in an image made up of C columns and of L lines of pixels therefore involves sending L×M messages, because the data item sought comprises L binary words. Advantageously, the invention makes it possible to improve the performance levels of the conventional methods for maintaining cache consistency by taking into account the predictable characteristics of the memory accesses in order to reduce the number of messages sent. It is notably possible to have M messages sent instead of L×M messages for a write or read mode access request or an invalidation request for example.

Figure 3:
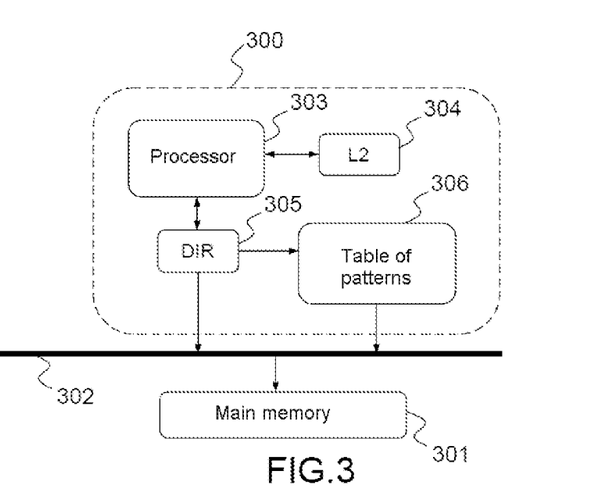
FIG. 3 shows an exemplary core architecture according to the invention.

FIG. 3 presents an example of a multi-core system architecture according to the invention. In this example, a single core 300 is represented. This can transmit and/or receive data contained in the main memory 301 using a communication bus 302. In the interests of clarity of the explanation, a single core is represented in this figure, but the invention relates to a multi-core system. Thus, a plurality of cores can access the main memory as well as the cache memory of the other cores of the system via said communication bus 302.

Preferentially, the multi-core system according to the invention is based on a "mesh" type network in order to allow for an efficient management of the cache consistency, even for a large number of cores.

The core 300 comprises computation processor CPU 303, said CPU comprising a private cache memory of level L1, a shared cache memory of level L2 304, a consistency table 305 and another table 306 called table of patterns 306. The table of patterns is an area of the core in which patterns are stored. A pattern corresponds to a set of addresses associated with a data item. To obtain this set of addresses, a pattern function is used. This function makes it possible to determine the addresses of a pattern from parameters such as, for example, a base address AdB. The patterns are used to rapidly access a data item made up of a number of binary words. The use of these patterns is particularly useful when said binary words are stored at addresses which are not consecutive. The table of patterns 306 is intended for the implementation of memory access operations. The table of patterns can be managed entirely from the processor of the core 303 or else in collaboration with a hardware accelerator 306. This hardware accelerator can be implemented in the core, the functions of said accelerator being to store the table of patterns and to establish the mapping between an input address and one of the stored patterns.

A core usually comprises a plurality of cache memory areas. The cache data of level L1 are always present in the level L2 cache.

When the core seeks to access a data item, a method comprising a number of steps can be applied. An example is given below.

The method comprises a first step during which a check is carried out to see if the data item sought is located in the level L1 cache.

If the data item is found therein, the method ends.

If the data item is absent, a level L1 cache fault is detected.

There is then a second step whose function is to check whether the data item sought is located in the level L2 cache.

If the data item is found therein, the method ends.

If the data item is absent, a level L2 cache fault is detected.

In case of level L2 cache fault, a step relies on the analysis of the consistency table 305. Said table is, for example, analyzed line by line.

If the address of the data item is found in the cache table, the processor to access this data item and the execution of the method ends.

If the address of the data item is not found therein, a cache table fault is detected.

In case of cache table fault, there is a step of the method whose function is to interrogate the table of patterns 306 and, if a pattern is found, to send a message making it possible to obtain the data associated with the application of the pattern and thus have access to the data item sought. The use of the patterns and of the table of patterns is described below.

In the context of the invention, the patterns are used to rapidly determine the location in the multi-core system of the binary words that make up a data item. Different pattern formats can be envisaged.

Preferentially, the patterns can be determined by taking into account two criteria.

The first criterion consists in maximizing the conciseness of the function associated with the pattern. The more concise the function associated with the pattern is, the more the memory space needed for its storage is reduced.

The second criterion consists in maximizing the expressiveness of the format and the different classes of patterns that might be involved. Complex patterns can thus be stored. These two criteria unfortunately tend to be antagonist.

As an example, the following simple pattern can be used:

$$Desc = f(AdB, L, D) \quad (1)$$

in which:

$f()$ represents the function of the pattern. This function returns, for example, the L addresses starting from the address AdB, said L addresses being spaced apart by D;

Desc represents the pattern descriptor, that is to say the series of addresses resulting from the application of the function $f()$ with the set of parameters AdB, L and D;

AdB represents the base address, said address corresponding to the first address of the series of addresses that make up the pattern of the data item sought;

L is an integer number corresponding to the number of binary words contained in the data item sought;

D corresponds to the offset making it possible to go from the address of one binary word to the address of the next binary word contained in the pattern. In other words, D corresponds to the distance between two consecutive addresses.

By using the pattern given in example (1), it is, for example, possible to access the L pixels of a column of an image comprising C columns of pixels by indicating that the length of the pattern is L and the offset is C.

The selection of the patterns for a given application can be performed by analyzing the memory accesses during executions of said application. Once the patterns have been selected, the latter can be implemented or stored in a table of patterns.

These analyses can be implemented by using, for example, profiling techniques for the application concerned.

Figure 4:
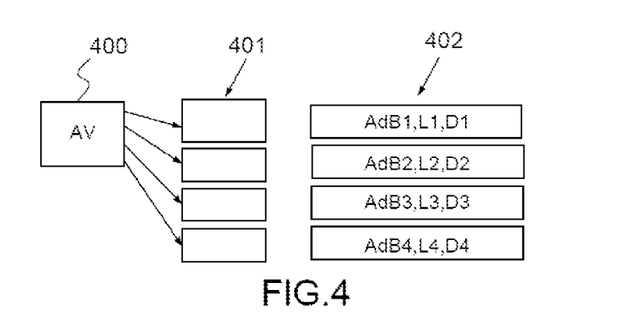
FIG. 4 gives an example of a table of patterns present in the cores of a multi-core system according to the invention.

FIG. 4 gives an example of a table of patterns. As explained previously, the set of patterns associated with the application implemented by the multi-core system is made available to the computation cores. For this, a table of patterns is present in each core. The table of patterns is, for example, loaded when the system is started up. A hash table can be used as table of patterns in the memory of the hardware accelerator responsible for managing the table of patterns when such an accelerator is used.

A table of patterns that has the structure of a hash table has the structure of a cache memory with a key, said key also being designated "trigger". The hash table makes it possible to map the address to be checked AdB 400 to one of the stored patterns 402. For this, a hash function is used. It is applied for each key of the table of patterns. This function uses as input one of the keys 401 and the address sought AdB 400 as input parameters. It returns as result a Boolean indicating whether the pattern associated with the address AdB is or is not present in the table of patterns. If the pattern is present, the address AdB is compared to all the base addresses of the stored patterns AdB1 AdB2, AdB3, AdB4 in order to determine the correct pattern associated with the address sought. The use of such a hash function makes it possible to compare the address sought AdB to the addresses AdB1, AdB2, AdB3, AdB4 of the stored patterns only when it is certain that a pattern whose base address is equal to AdB is stored in the table of patterns. This has the advantage of reducing the computation complexity required to find a stored pattern from the address sought AdB.

As an example, if a core seeks the data item present at the address @11 and this address corresponds to one of the base addresses stored 402 in the table of patterns, a message is sent to the processor of the core by a module responsible for managing the table of patterns of said core, said message indicating that a pattern has been found, and transmits to it the descriptor of this pattern.

By using the pattern example of the expression (1), the descriptor corresponding to the base address @11 with L=4 and D=2 will be equal to {@ 11, 4, 2}. In this example, the pattern descriptor will be equal to:

$$f(@11, 4, 2) = \{@11, @13, @15, @17\} \quad (2)$$

In a preferred embodiment, the method for maintaining cache memory consistency according to the invention is implemented in a multi-core system by relying, on the one hand, on a software part executed by the processors of the cores and, on the other hand, on a hardware accelerator dedicated to managing the patterns. The software part corresponds to a hybrid protocol that takes into account the memory access patterns. The software part comprises, for example, the following means:

means for differentiating the conventional memory access requests from the speculative requests;

means for sending so-called speculative requests that make it possible to read all the addresses of a pattern from a base address;

the speculative requests send messages by page (page granularity).

Figure 5:
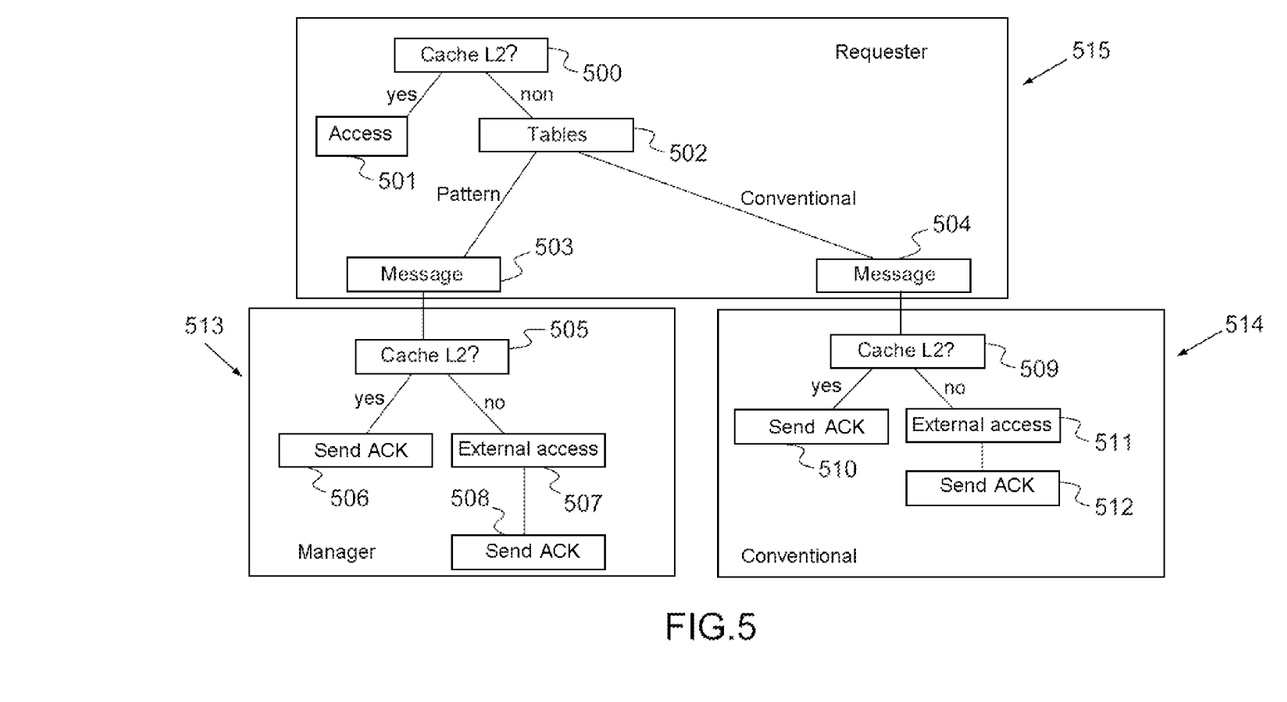
FIG. 5 gives an example of the sequence of operations and of messages sent between a plurality of cores belonging to a multi-core system implementing the invention.

FIG. 5 gives an example of the sequence of operations and messages sent between a plurality of cores belonging to a multi-core system implementing the invention.

In this example, a core called requesting core CD 515 needs to read a digital data item to be able to execute a process for which it is responsible.

If this data item is not in its level L1 cache memory, it will check whether said data item is not present in its level L2 cache memory 500. Following this check, either the data item is found and the processor of the requesting core 515 accesses it 501, or the data item is not there and a cache fault is detected.

When a cache fault is detected, the processor of the requesting core 515 will try to find the data item sought elsewhere than in its cache memory.

The consistency and pattern tables are then consulted 502.

If, following the consultation of the consistency table, the address corresponding to the data item sought is found, an access message is sent 504 to a conventional manager core CGC 514 associated with the address sought AdB, a conventional manager core taking into account the data read only at a single address. The conventional manager CGC 514 then checks whether the data item is not present in its cache memory 509. If it is, a confirmation message ACK is sent to the requesting core 510 with the data item sought, otherwise an external access to the main memory 511 is used to acquire the data item and a confirmation message ACK 512 is then sent to the requesting core with the data item.

If, after consultation of the consistency table, the data item is not found, it is the turn of the table of patterns to be consulted by the requesting core. If, following the consultation 502 of the table of patterns, the address corresponding to the data item sought is found, a message called speculative message is sent to the core managing the pattern CGM 513. This message contains the descriptor of the pattern corresponding to the data item sought as well as its base address, the latter normally being included in said descriptor. The CGM core 513 then checks whether the data item is present in its cache memory.

If it is, a confirmation message ACK 506 is sent to the requesting core at the same time as the required data item as soon as the data item sought is found.

On the other hand, if the data item is not present in cache memory, the latter is acquired 507 by an external access to the main memory. A confirmation message ACK 508 is then transmitted to the requesting core with the data item sought. On the CGM core 513, the data search process returns as a priority the requested data item, then iterates on the continuation of the pattern. This is why the request is qualified as speculative.

It then appears that the introduction of a table of patterns on each core makes it possible to put in place two message flows for accesses to the data. A first flow is generated by accesses to data which are not referenced in the table of patterns.

A second flow of messages is generated by the accesses to the addresses present in the table of patterns.

In a multi-core architecture, the cores are usually associated with indices. Thus, each core belonging to a multi-core system comprising N cores will be associated with an index ranging from 1 to N for example.

As an example, shrewdly selected functions enable the requesting core to find the index of the conventional manager core CGC and of the pattern manager core. To find the conventional manager core associated with a data item that has the base address AdB, the requesting core can use the following expression:

$$CGCi=(AdB/TL)\%N \quad (3)$$

This expression devolves from the round-robin algorithm applied with a granularity of the size of a cache line TL. CGCi represents the index of the conventional manager core.

In this case, the function for finding the pattern manager core CGM is:

$$CGMi=(AdB/TP)\%N \quad (4)$$

CGMi represents the index of the pattern manager core. The round-robin algorithm is, this time, applied with a granularity of the size TP of the pages. The granularity of the data, that is to say the consistency unit, does, however, remain equal to the size of a cache line, the aim being to avoid the false sharing problem, that is to say the saturation of the system by a large number of read or write requests, for example when all the cores of the system make a read request to the same core.

Figure 6:
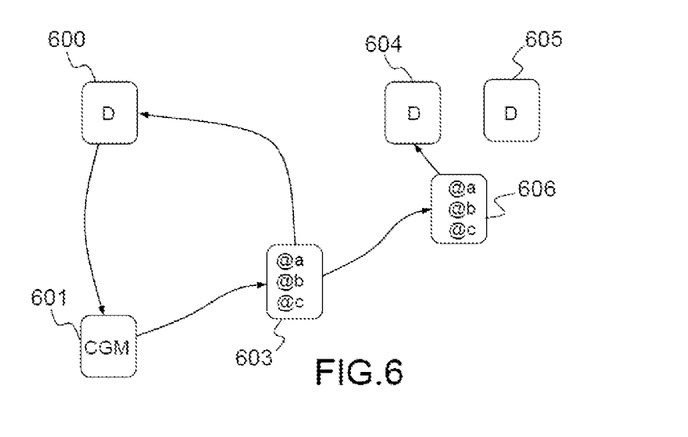
FIG. 6 gives an example of write request with migration.

FIG. 6 gives an example of write request with data migration.

The data migration makes it possible to bring the data stored in cache memory closer to the cores that use them to simplify their access.

A requesting core 600 sends a write mode request to the address @a. In this example, a cache fault is detected. The table of patterns of the core 600 is consulted and a pattern mapping is identified, the descriptor of the pattern being {@a, @b, @c}. This descriptor is then transmitted to the appropriate pattern manager core CGM 601, that is to say to the core associated with the pattern identified by the requesting core 600.

In shared read mode, the CGM core 601 sends a message to the core(s) 603 that include the pattern, said message comprising the data item to be written corresponding to the addresses of the pattern.

In order to speed up the access to the data of the addresses @a, @b and @c by other requesting cores 604, 605, the CGM core 601 also sends a migration message to the core containing these data in order for the latter to be able to copy them into the cache memory of another core 606 closer to the other requesters. The requesters close to this core will then be able to quickly access these data. In other words, the CGM core 601 has anticipated the speculative address request @a, @b, @c, the consequence being the migration of the associated data.

The invention claimed is:

1. A multi-core system comprising a plurality of cores and a communication bus enabling the cores to communicate with one another, a core being made up of a processor and of at least one cache memory area, wherein:

at least one core comprises a table of patterns in which are stored a set of patterns, a pattern corresponding to a series of memory addresses associated with a digital data item made up of binary words stored at these addresses;

this core also comprises means for mapping one of the memory addresses AdB of a digital data item to a pattern that is associated with it when said core needs to access this data item as well as means for transmitting a unique message for access to a digital data item located in the cache memory of at least one other core of the system, said message including the memory addresses that make up the pattern of the data item sought.

2. The system as claimed in claim 1, in which all of the cores of the system include a table of patterns.

3. The system as claimed in claim 1, in which the table of patterns of a core is controlled by the processor of said core in collaboration with a hardware accelerator, the functions of said accelerator being to store the table of patterns and to establish the mapping between an input memory address AdB and one of the stored patterns.

4. The system as claimed in claim 1, in which the series of addresses that make up a pattern is obtained by a pattern function applied to the input memory address AdB.

5. The system as claimed in claim 1, in which the patterns used are defined as follows:

$$Desc = f(AdB, L, D)$$

in which:
 $f(\ )$ represents the function of the pattern, said function returning the L addresses starting from the address AdB, said L addresses being spaced apart by D addresses;
 Desc represents the pattern descriptor, that is to say the series of addresses resulting from the application of the function $f(\ )$ with the set of parameters AdB, L and D;
 AdB represents the base address, said address corresponding to the first address of the series of addresses that make up the pattern of the data item sought;
 L is an integer number corresponding to the number of binary words included in the data item sought;
 D corresponds to the offset that makes it possible to go from the address of a binary word to the address of the next binary word included in the pattern.

6. The system as claimed in claim 1, in which the table of patterns is loaded when the system is started up.

7. The system as claimed in claim 1, in which the table of patterns is a hash table.

8. The system as claimed in claim 1, in which, when a core comprising a table of patterns requires memory access to a data item associated with a memory address AdB and a pattern is found, this core sends a message to another core, called pattern manager core CGM in charge of managing this pattern, the function of said CGM core being to find the data item associated with the pattern in its cache memory and to send it to the requesting core.

9. The system as claimed in claim 8, wherein each core of the system is identified by an index, the index of a CGM core being determined by using the expression:

$$CGM = (AdB/TP)\%N$$

in which:
 CGMi represents the index of the pattern manager core;
 TP represents the size of the memory pages of the system;
 AdB represents the base address of the data item sought;
 N represents the total number of cores of the system.

10. The system as claimed in claim 1, wherein a consistency table is stored in at least one of the cores of the system, said table comprising an indication of the presence or of the absence of digital data items in the cache memory of other cores of the system.

11. The system as claimed in claim 10, wherein a core is called conventional manager core CGC when it comprises a data item sought by another core, called requesting core, and comprising a consistency table, said data item having been located in the CGC core by virtue of said table, a CGC being identified by the requesting core by using the following expression:

$$CGCi = (AdB/TL)\%N$$

in which:
 CGCi represents the index of the conventional manager core;
 TL represents the size of a cache memory line.

12. The system as claimed in claim 1, wherein the cores are interconnected by a network with "mesh" type topology.

13. A data search method for memory access via a core included in a multi-core system as claimed in claim 1, the following steps being applied when access to a data item stored in the system is requested by said core:
 a step of searching for the data item sought in the cache memory of said core;
 if the search is unsuccessful, a step of checking for the presence of the data item sought in the cache memory of another core by using a table of patterns;
 if a pattern associated with the data item sought is found, a step of sending a unique access message comprising the addresses of the pattern to the core responsible for said pattern.

14. The method as claimed in claim 13, further comprising a step of checking for the presence of the data item sought in the cache memory of another core by using a consistency table.

* * * * *